United States Patent
Gu et al.

(10) Patent No.: US 8,970,710 B2
(45) Date of Patent: Mar. 3, 2015

(54) METHOD AND APPARATUS FOR MEASURING QUALITY OF VIDEO BASED ON FRAME LOSS PATTERN

(75) Inventors: Xiao Dong Gu, Beijing (CN); De Bing Liu, Beijing (CN); Zhi Bo Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/989,130

(22) PCT Filed: Nov. 30, 2010

(86) PCT No.: PCT/CN2010/001922
§ 371 (c)(1),
(2), (4) Date: May 23, 2013

(87) PCT Pub. No.: WO2012/071680
PCT Pub. Date: Jun. 7, 2012

(65) Prior Publication Data
US 2013/0235214 A1    Sep. 12, 2013

(51) Int. Cl.
*H04N 17/00* (2006.01)
*H04N 17/02* (2006.01)

(52) U.S. Cl.
CPC .............. *H04N 17/00* (2013.01); *H04N 17/004* (2013.01)
USPC ........... 348/180; 348/181; 348/189; 348/192; 348/193; 348/208.15; 348/14.12; 348/14.15; 348/446; 348/456; 348/490; 348/524; 348/569; 348/570; 348/607; 348/608; 348/636; 348/680; 348/693; 348/700; 348/701; 348/715; 348/723; 370/203; 370/240; 370/242; 370/466; 375/240.01; 375/240.02; 375/240.18; 375/240.27; 386/326; 386/327; 386/328; 386/329; 386/330; 386/331; 386/332; 386/333; 386/334; 386/335; 386/336; 386/337; 386/338; 386/339; 386/340; 386/341; 725/106; 725/107

(58) Field of Classification Search
USPC ........... 348/180, 192, 14.12, 14.15, 446, 607, 348/181, 189, 193, 700, 701, 208.15, 456, 348/490, 524, 569, 570, 608, 636, 680, 693, 348/715, 723; 375/240.01, 240.02, 240.18, 375/240.27; 725/107, 106; 370/203, 240, 370/242, 466; 386/326–342
See application file for complete search history.

(56) References Cited

U.S. PATENT DOCUMENTS 7,233,348 B2 * 6/2007 Bourret ........................ 348/180
8,150,234 B2 * 4/2012 Bourret ........................ 386/263
(Continued)

FOREIGN PATENT DOCUMENTS

CN    101558657    10/2009
CN    101635846    1/2010
(Continued)

OTHER PUBLICATIONS
Search Report: Aug. 25, 2011.
(Continued)

*Primary Examiner* — Jefferey Harold
*Assistant Examiner* — Mustafizur Rahman
(74) *Attorney, Agent, or Firm* — Robert D. Shedd; Robert B. Levy

(57) ABSTRACT

A method and apparatus for measuring the quality of a video is provided. The method comprises: generating a frame loss pattern of the video by indicating whether each frame in the video is lost or successfully transmitted; and evaluating the quality of the video as a function of the generated t came loss pattern.

10 Claims, 6 Drawing Sheets

(56) References Cited

U.S. PATENT DOCUMENTS

| | | | |
|---|---|---|---|
| 8,843,979 | B2 | 9/2014 | Berkey et al. |
| 2003/0121053 | A1* | 6/2003 | Honda .......................... 725/107 |
| 2003/0142214 | A1* | 7/2003 | Bourret ......................... 348/180 |
| 2007/0047640 | A1* | 3/2007 | Venna et al. ............. 375/240.01 |
| 2007/0237227 | A1 | 10/2007 | Yang et al. |
| 2007/0242080 | A1* | 10/2007 | Hamada et al. ............... 345/606 |
| 2008/0192119 | A1* | 8/2008 | Li et al. .......................... 348/180 |
| 2008/0205856 | A1* | 8/2008 | Kim et al. ..................... 386/124 |
| 2008/0316362 | A1* | 12/2008 | Qiu et al. ...................... 348/607 |
| 2009/0148058 | A1* | 6/2009 | Dane et al. .................... 382/251 |
| 2009/0196188 | A1* | 8/2009 | Takeyoshi et al. ............. 370/242 |
| 2010/0002771 | A1* | 1/2010 | Huang et al. ............. 375/240.16 |
| 2010/0039943 | A1* | 2/2010 | Ryoo et al. .................... 370/242 |
| 2010/0042843 | A1* | 2/2010 | Brunk et al. .................. 713/176 |
| 2010/0053336 | A1* | 3/2010 | Bourret ......................... 348/180 |
| 2010/0091841 | A1* | 4/2010 | Ishtiaq et al. ............ 375/240.02 |
| 2010/0095455 | A1 | 4/2010 | Brinkerhoff et al. |

FOREIGN PATENT DOCUMENTS

| | | |
|---|---|---|
| EP | 2077672 | 7/2009 |
| EP | 2296379 | 3/2011 |
| KR | 2009018834 | 2/2009 |
| WO | WO2008119924 | 10/2008 |
| WO | WO2009087863 | 7/2009 |

OTHER PUBLICATIONS

Duan et al: "Shot-Level Camera Motion Estimation Based on a Parametric Model"; Proceedings of the TREC Video Retrieval Evaluation Online Proceedings; Oct. 15, 2005.

Yang et al: "Perceptual Temporal Quality Metric for Compressed Video"; IEEE Transaction on Multimedia, vol. 9, issue 7, Nov. 2007 pp. 1528-1535.

Pastrana-Vidal et al: "Automatic Quality Assessment of Video Fluidity Impairments Using a No Reference Metric." International Workshop on Video Processing and Quality Metric for Consumer Electronics.

Yang et al: "Temporal Quality Evaluation for Enhancing Compressed Video", Proceedings of 16th Int'l Conference on Computer Communications & Networks, Aug. 13-16, 2007; Honolulu, Hawaii.

Tasaka et al: "Enhancement of QoE in Audio-Video IP Transmission by Utilizing Tradeoff Between Spatial and Temporal Quality for Video Packet Loss"; IEEE Global Telecommunication Conference; Nov. 30-Dec. 4, 2008; New Orleans, Louisiana.

Sun et al: "Low Complexity Frame Importance Modelling and Resource Allocation Scheme for Error Resilience H. 264 Video Streaming"; IEEE 10th Workshop on Multimedia Signal Processing, Oct. 8-10, 2008, Cairns, Australia.

Xu et al: "A Novel Algorithm for Video Smoothness Evaluaton"; Int'l Conference on Advanced Computer Theory & Engineering; Dec. 20-22, 2008.

* cited by examiner (a)

Pattern 1

Pattern 2

(b)

METHOD AND APPARATUS FOR MEASURING QUALITY OF VIDEO BASED ON FRAME LOSS PATTERN

This application claims the benefit, under 35 U.S.C. §365 of International Application PCT/CN2010/001922, filed Nov. 30, 2010, which was published in accordance with PCT Article 21(2) on Jun. 7, 2012 in English.

FIELD OF THE INVENTION

This invention relates to method and apparatus for measuring quality of a video based on frame loss pattern.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a transmission of digitally compressed video, a very important source of impairments comes from the delivery of the video stream over an error-prone channel. Partial loss or partial corruption of information can have a dramatic impact on user's perceived quality because a localized distortion within a frame can spatially and temporally propagate over frames. The visual impact of such frame loss varies between video decoders depending on their ability to deal with corrupted streams. In some cases, a decoder may decide to drop some frames on its own initiative. For example, a decoder can entirely drop or discard the frame that has corrupted or missing information and repeat the previous video frame instead until the next valid decoded frame is available. Encoders can also drop frames during a sudden increase of motion in the content in a case that the target encoding bit rate is too low. In all the-above case, we call a frame loss occurs in a video.

In many existing video quality monitoring products, the overall video quality of a media will be analyzed based on three main coding artifacts, which are jerkiness, blockiness and blurring. Blockiness and blurring are two main kinds of spatial coding artifacts which behave as discontinuity in block boundary and high frequency loss respectively. While jerkniess is the most important temporal artifacts.

A temporal video quality degradation caused by a set of group frame losses is called a jerkiness, wherein the group frame loss means a fact that one or more consecutive frames in a video sequence are lost together.

There are some studies about the evaluation of the perceptual impact of (periodic and non-periodic) video frame losses on perceived video quality.

In K. C. Yang, C. C. Guest, K. EI-Maleh and P. K. Das, "Perceptual Temporal Quality Metric for Compressed Video". IEEE Transaction on Multimedia, vol.9, no.7, November 2007, pp.1528-1535 (hereinafter referred to as prior art 1), it was pointed out that humans usually have higher tolerance to consistent frame loss and the negative impact is highly related to the consistency of frame loss, which is then be used as a measurement of jerkiness.

In R. Pastrana-Vidal and J. C. Gicquel, "Automatic Quality Assessment of Video Fluidity Impairments Using a No-Reference Metric", the 2nd International Workshop on Video Processing and Quality Metric for Consumer Electronics, Scottsdale, USA 22-24, January 2006 (hereinafter referred to as prior art 2), the relationship between perceptual impacts of jerkiness and the length and occurrence frequency of the group frame losses was mentioned.

SUMMARY OF THE INVENTION

The inventors of the present invention have found that a frame loss pattern of a video has a great influence on the perceptual impact of jerkiness, which in turn will impact the overall video quality. By "frame loss pattern", it means a pattern generated by recording in sequence the status of each frame in a video sequence on whether they are successfully transmitted or lost during transmission with different representations.

Therefore, the present invention makes use of this finding, by providing a method for measuring the quality of a video, and a corresponding apparatus.

In one embodiment, a method for measuring a quality of video is provided. The method comprises: generating a frame loss pattern of the video by indicating whether each frame in the video is lost or successfully transmitted; and evaluating the quality of the video as a function of the generated frame loss pattern.

In one embodiment, an apparatus for measuring a quality of video is provided. The apparatus comprises: means for receiving an input video and generating a frame loss pattern of the received video; and means for evaluating the quality of the video as a function of the generated frame loss pattern.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, in which.

DETAILED DESCRIPTION OF THE INVENTION

In the following description, various aspects of an embodiment of the present invention will be described. For purposes of explanation, specific configurations and details are set forth in order to provide a thorough understanding. However, it will also be apparent to one skilled in the art that the present invention may be practiced without the specific details present herein.

Figure 1:
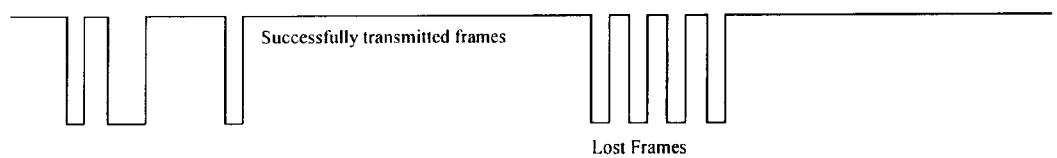
FIG. 1 is an exemplary diagram showing several examples of frame loss pattern of a video.
Figure 1:
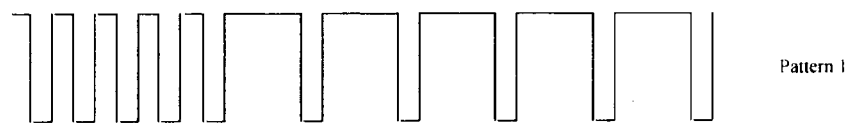
Figure 1:
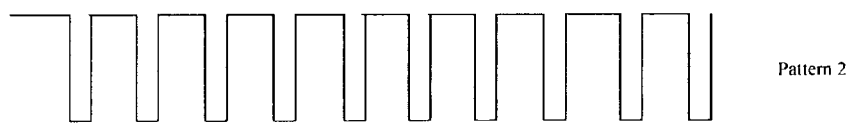

FIG. 1 is an exemplary diagram showing several .examples of frame loss pattern of a video. As described above, a frame loss pattern is generated by recording in sequence the status of each frame in the video with different representations. For example, a frame loss pattern can be represented by a 0-1 series, such as "1, 1, 1, 1, 0, 0, 1, 1, 1, 0, 1", where "0" represents a corresponding frame is lost during transmission while "1" represents a successful transmission of the frame. A frame loss pattern can also be in a form of a diagram with high/low level thereof representing respectively a successful frame transmission and a frame loss. FIG. 1(a) shows such a frame loss pattern of a video wherein each low level (valley) of the diagram means a group frame loss containing one or more consecutive frame loss while successfully transmitted frames are represented by a high level (top) of the diagram. FIG. 1(b) shows two different frame loss patterns, "Pattern 1" and "Pattern 2", which are both composed of 10 group frame losses with each group frame loss having the same length. According to the research results of the prior arts 1 and 2, which do not consider the frame loss pattern as one factor that influences perceptual jerkiness of the video, the video quality degradations caused by the above two "Pattern 1" and "Pattern2" should be very similar. However, the study of the inventors of the present invention reaches a completely different conclusion for the above case.

According to the finding of the inventor, the perceptual impact of jerkiness will be greatly influenced by the frame loss pattern. The following cases (1) to (3) are taken as an example, which are within a same frame loss ratio.

Case (1): One frame is lost in every two frames;
Case (2): Four consecutive frames are lost in every eight frames;
Case (3): The last half of the video sequences is totally M lost.

The overall frame loss ratio in all of the above three cases is 50%. However, their perceptual impact is quite different. in case 1, a viewer will perceive clear dithering and even feel sick after long period browsing; while in case 3, the viewer will not perceive such kind of phoeneman but will be facing a long period freezing. That is, totally different perceptions will be caused by different frame loss pattern with the same frame loss rate.

According to an embodiment of the present invention, a method for measuring the quality of a video is provided based on the above finding.

Figure 2:
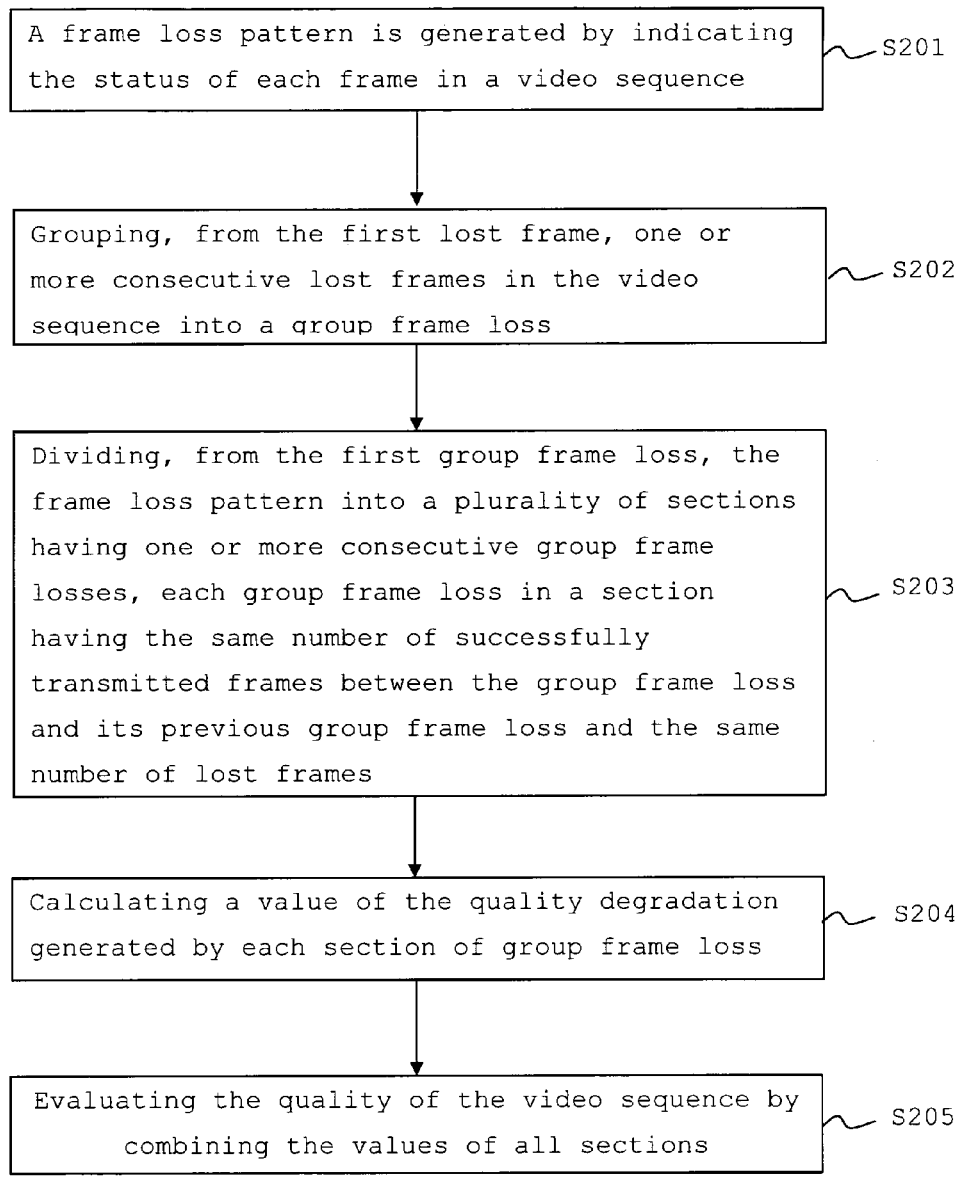
FIG. 2 is a flow chart showing a method for measuring the quality of a video based on frame loss pattern according to an embodiment of the present invention.

FIG. 2 is a flow chart showing a method for measuring the quality of a video based on frame loss pattern according to an embodiment of the present invention.

As shown in FIG. 2, the method comprises the following steps:

S201: a frame loss pattern is generated by indicating the status (lost or successfully transmitted) of each frame in a video sequence;

S202: grouping, from the first lost frame, one or more consecutive lost frames in the video sequence into a group frame loss;

S203: dividing, from the first group frame loss, the frame loss pattern into a plurality of sections having one or more consecutive group frame losses, each group frame loss in a section having the same number of successfully transmitted frames between the group frame loss and its previous group frame loss and the same number of lost frames;

S204: calculating a value of the quality degradation generated by each section of group frame loss;

S205: evaluating the quality of the video sequence by combining the values of all sections.

Next, a detailed description will be given with reference to attached drawings.

In the method according to the embodiment of the invention, firstly a frame loss pattern of a video sequence is generated. This can be achieved by indicating the status of all frames in the video sequence by an appropriate manner. It can be appreciated by a person skilled in the art that a frame loss can be detected by known methods. No further details will be given for this point.

Next, starting from the first one of all the lost frames in the video sequence, one or more consecutive lost frames will be grouped into one group which is called a group frame loss.

Denote the considered frame loss pattern $FLP=\{gd_1, gd_2, \ldots, gd_R | gd_i=(gap^{gd}_i, len^{gd}_i)\}$ which is given by time stamp, wherein $gd_i$ represents the $i^{th}$ group frame loss. Then the frame loss pattern will be divided (or segmentated), from the first group frame loss, into a plurality of sub-sections. Each sub-section comprises one or more consecutive group frame losses, each of which has similar perceptual impact on the quality degradation of the video sequence.

For the above purpose of dividing consecutive group frame losses with a similar perceptual impact, in this method, each group frame loss in a video sequence can be identified by two parameters $gd=(gap^{gp}, len^{gd})$: the first parameter $gap^{gd}$ is the number of successfully transmitted frames between the IS current group frame loss and the previous group frame loss; and the second parameter $len^{gd}$ is the number of lost frames in the current group frame loss. Both the value of $gap^{gd}$ and $len^{gd}$ can be limited as an integer between 1 and 10. If all the group frame losses in a segmented sub-section have the same parameters $gap^{gd}$ and $len^{gd}$, they will have similar perceptual impact on the quality degradation of the video sequence.

A distance function $d(gd_1, gd_2)=|f(gap^{gd}_1, len^{gd}_1)-f(gap^{gd}_2, len^{gd}_2)|$ can be used as a measurement of the difference in perceptual impact between two group frame losses in a sub-section. In the above distance function, function $f(x,y)$ is used for a perceptual quality evaluation of a video, which will be described later.

The frame loss pattern is then segmentated into sub-sections based upon the definition of the distance function.

The following is a pseudo-code of the distance function.

```
Procedure Segmentation
1. nCount=0, pool={ };           // defined as the number / the
set of sub-sections
2. for (i =0, i<=n, i++){
    2.1 if (d(gd, gd₁) < c) for each gd ∈ pool
        then insert gd₁ into pool ;
        else { SubSection_{nCount} = pool;pool = { }; nCount + + } ;
}
```

In the above pseudo-code, c is a constant number. This procedure divides the frame loss pattern FLP into a set of sub-sections:

$$FLP=\{SubSection_1, SubSection_2, \ldots, SubSection_{nCount}\}.$$

Figure 3:
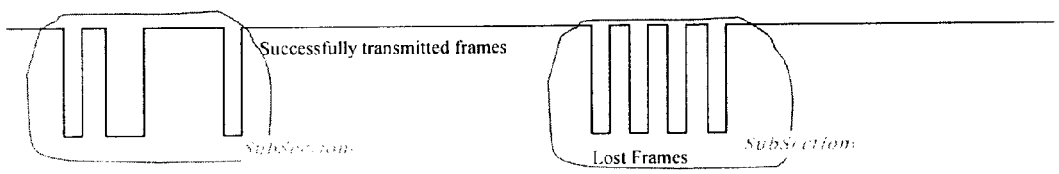
FIG. 3 is an exemplary diagram showing a frame loss pattern is divided into two sub-sections.

FIG. 3 shows an example in which the above frame loss pattern is divided into two sub-sections. As shown in FIG. 3, the group frame losses inside one sub-section are considered to be of similar perceptual impact, and the two neighboring sub-sections are linked by several successfully transmitted frames.

Next, a perceptual evaluation of each sub-section will be carried out.

It can be appreciated that since the group frame losses inside a same sub-section are considered to be of similar perceptual impact, the sub-section can be treated as a typically periodic frame loss.

Therefore, each sub-section is also identified by two parameters $SubSection=(gap^{ss}, len^{ss})$: the first parameter $gap^{ss}$ is the average number of successfully transmitted frames between two neighboring group frame losses and the second parameter $len^{ss}$ is the average number of lost frame of all the group frame losses in the sub-section.

Simply speaking, the sub-section's feature values of $gap^{ss}$ and $len^{ss}$ are exactly the average values of $gap^{gd}$ and $len^{gd}$ over all the group frame losses inside the sub-section.

It is then supposed that the perceptual quality degradation of the sub-section is determined by the feature values of gap and len. Defined as:

$$J_p(\text{SubSection})=f_p(gap^{ss},len^{ss}) \quad (1)$$

By subjective examination, for some discrete values of $(gap^{ss},len^{ss})$, the perceptual quality evaluation can be marked manually. For this purpose, we define the discrete function $f(x, y)$ with $x,y \in (1,2, \ldots, 10)$.

As an example, the function $f(x,y)$ can be defined as:

$$f(x, y) = \begin{cases} f_1(x, y) & CameraMotion < c_{still} \\ f_2(x, y) & Otherwise \end{cases}$$

where $c_{still}$ constant number as a threshold, CameraMotion is a measurement of the level of camera motions in the sub-section. And $f_1(x,y)$ $f_2(x,y)$ are given in the below tables:

TABLE 1

$f_1 (x, y)$

| | 1 | 2 | 3 | 4 | 5 | 6 | 7 | 8 | 9 | 10 |
|---|---|---|---|---|---|---|---|---|---|---|
| 1 | 1 | 1 | 1 | 1 | 1 | 1 | 1 | 1 | 1 | 1 |
| 2 | 1 | 1 | 1 | 1 | 1 | 1 | 1 | 1 | 1 | 1 |
| 3 | 1 | 1 | 1 | 1 | 1 | 2 | 2 | 2 | 2 | 2 |
| 4 | 2 | 2 | 2 | 2 | 2 | 2 | 2 | 2 | 2 | 2 |
| 5 | 2 | 2 | 3 | 3 | 3 | 3 | 3 | 3 | 3 | 3 |
| 6 | 3 | 3 | 3 | 3 | 3 | 3 | 4 | 5 | 5 | 5 |
| 7 | 3 | 3 | 3 | 4 | 4 | 5 | 5 | 5 | 5 | 5 |
| 8 | 3 | 4 | 4 | 4 | 5 | 5 | 5 | 5 | 5 | 5 |
| 9 | 4 | 5 | 5 | 5 | 5 | 5 | 5 | 5 | 5 | 5 |
| 10 | 4 | 5 | 5 | 5 | 5 | 5 | 5 | 5 | 5 | 5 |

TABLE 2

$f_2 (x, y)$

| | 1 | 2 | 3 | 4 | 5 | 6 | 7 | 8 | 9 | 10 |
|---|---|---|---|---|---|---|---|---|---|---|
| 1 | 1 | 1 | 1 | 1 | 1 | 1 | 1 | 1 | 1 | 1 |
| 2 | 2 | 2 | 2 | 2 | 3 | 3 | 3 | 3 | 4 | 4 | 4 |
| 3 | 3 | 4 | 5 | 5 | 5 | 5 | 5 | 5 | 5 | 5 |
| 4 | 4 | 5 | 5 | 5 | 5 | 5 | 5 | 5 | 5 | 5 |
| 5 | 5 | 5 | 5 | 5 | 5 | 5 | 5 | 5 | 5 | 5 |
| 6 | 5 | 5 | 5 | 5 | 5 | 5 | 5 | 5 | 5 | 5 |
| 7 | 5 | 5 | 5 | 5 | 5 | 5 | 5 | 5 | 5 | 5 |
| 8 | 5 | 5 | 5 | 5 | 5 | 5 | 5 | 5 | 5 | 5 |
| 9 | 5 | 5 | 5 | 5 | 5 | 5 | 5 | 5 | 5 | 5 |
| 10 | 5 | 5 | 5 | 5 | 5 | 5 | 5 | 5 | 5 | 5 |

Since camera motions will be another important factor that influences the perceptual quality, the level of camera motions also needs to be estimated.

The camera motions can be estimated by known methods. One of the most important global motion estimation models is the eight-parameter perspective motion model described by L. Y. Duan, J. Q. Wang et al, "Shot-Level Camera Motion Estimation based on a Parametric Model" (hereinafter referred to as prior art 3).

The prior art 3 disclosed the following equations:

$$x_i^1=(a_0+a_2x_i+a_3y_i)/(1+a_6x_i+a_7y_i)$$

$$y_i^1 32 \ (a_1+a_4x_i+a_5y_i)/(1+a_6x_i+a_7y_i)$$

where $(a_0, \ldots, a_7)$ are the global motion parameters, $(x_i, y_i)$ denotes the spatial coordinates of the ith pixel in the current frame and $(x_i^I,y_i^I)$ denotes the coordinates of the corresponding pixel in the previous frame. The relationship between motion model parameters and symbol-level interpretation is established:

$$Pan=a_0$$

$$Tilt=a_1$$

$$Zoom=(a_2+a_5)/2$$

The algorithms introduced in the prior art 3 is applied to extract the eight-parameter GME model in the method of the embodiment of the present invention. The level of the camera motion is finally defined as:

$$CameraMotion=\beta_1 \times Pan+\beta_2 \times Tilt+\beta_3 \times Zoom$$

Then $f_p(x,y)=f(x,y)$ is defined for $x,y \in (1, 2, \ldots, 10)$. There is also a problem on how to generalize the function $f_p(x,y)$ to those non-integer variables, which is a typical training problem. Therefore, a training machine (for example, Artifical Neural Network (ANN) which is known in the art) can be used to assign $J_p(\text{SubSection})=\text{ANN}(gap^{ss},len^{ss})$ while the machine is trained with $f(x, y)$.

Till now, a value $J_p$ of the perceptual quality degradation generated by each sub-section of the frame loss pattern is obtained.

Finally, the quality of the video sequence will be evaluated by combining the values of all sections of the frame loss pattern.

In this method, a pooling strategy can be used to combine these values into an overall quality evaluation of the video sequence. It should be pointed out that the pooling strategy of such a temporal quality is quite different from the pooling strategy when considering spatial artifacts such as blockiness, blur, etc. Because of the characteristic of a human vision system (HVS), people are "easy to hate, difficult to forgive". The successfully transmitted frames between two sub-sections which are of higher temporal quality will usually be ignored when considering the overall temporal quality.

In the above-described segemntation step, the video sequence is segmented into a set of sub-sections of periodic frame loss FLP=(SubSection$_1$, SubSection$_2$, . . . , SubSection$_{nCount}$), and every two neighboring sub-sections are separated by some successfully transmitted frames, denote NoLoss$_i$ the successfully transmitted frames between SubSection$_i$ and SubSection$_{i+1}$. For simplicity, The NoLoss$_i$ will be treated as a special kind of periodic frame loss with least quality degradation value 1. That is, we set $$J_p(\text{NoLoss})=1 \quad (2)$$

And then all these NoLoss$_i$ was inserted into the set FLP. Therefore, the overall quality degradation is defined as:

$$J = \frac{\Sigma_{flp_i \in FLP} w(flp_i) \times J_p(flp_i)}{\Sigma_{flp_i \in FLP} w(flp_i)} \quad (3)$$

Wherein $w(flp_i)$ is a weighting function for the element of FLP, which is defined as $$w(flp_i)=f_T(\text{dist}(flp_i)) \times f_D(J_p(flp_i)) \times \text{length}(flp_i) \quad (4)$$

In this expression, length($flp_i$) is the number of frames in $flp_i$; dist($flp_i$) is the distance of the center of $flp_i$ to the last frame; $J_p(flp_i)$ is the perceptual temporal degradation introduced by $flp_i$ as defined above.

$f_T$ is the function to describe human's "remember & forget" property. It is supposed that a viewer will provide his/her overall evaluation when he/she finished browsing the last frame. The sub-sections far away from the last frame will probability be forgotten by the viewer. The more far away, the higher probability to be forgot.

$f_D$ is the function to describe human's "easy to hate, hard to forgive" vision property. Human will get high impact to the sub-sections with a significant distortion while ignore most of the sub-sections without distortion.

Figure 4:
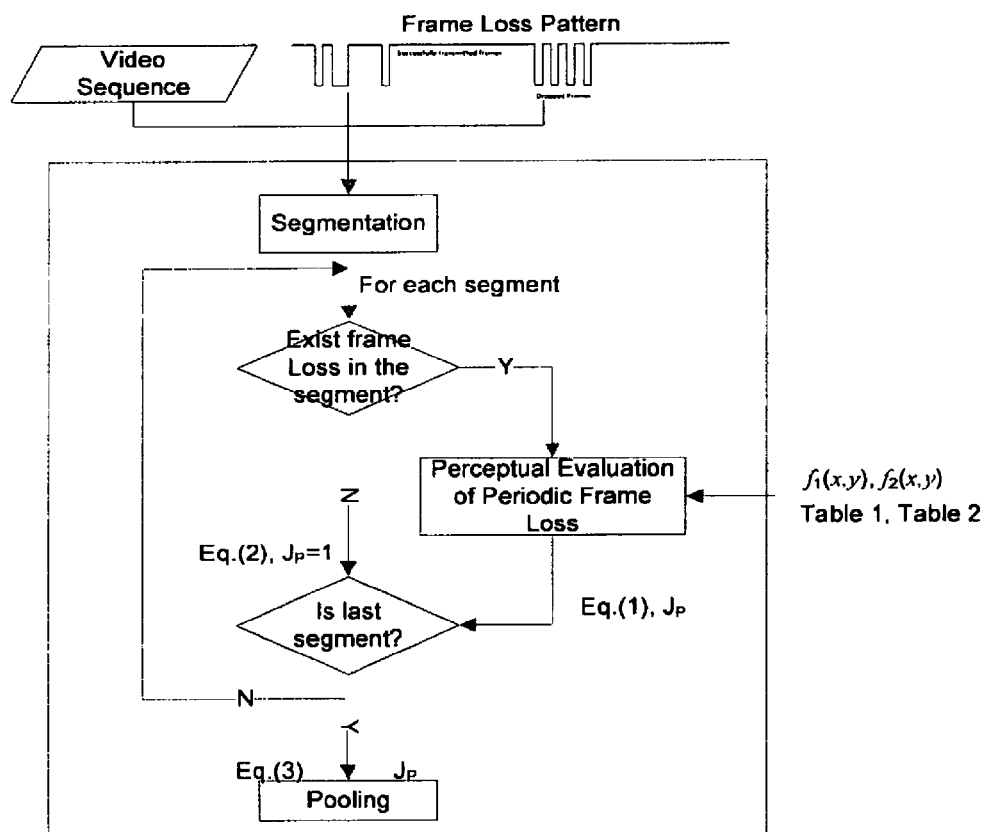
FIG. 4 is an exemplary diagram showing the framework of the method for measuring the quality of a video.

FIG. 4 is an exemplary diagram showing the framework of the method for measuring the quality of a video. The input of the framework is a received video sequence, together with the frame loss pattern (or time stamp) which indicates a loss/successful receipt of each frame. The output of the framework is a value J indicates the level of video quanlity (jerkiness), for the input video sequence.

As shown in FIG. 4, the main body of the framework is composed of three operations: (1) segmentation of the frame loss pattern of the input video; (2) perceptual evaluation for each section which is considered as a periodic frame loss; and (3) pooling.

In the segmentation step, the frame loss pattern of an input video sequence is divided into a set of sections as described above. These sections can be classified into two kinds, one of which (SubSection$_i$) is composed of similar group frame losses and considered as periodic frame loss inside the segment; and another kind (NoLoss$_j$) contains no frame loss.

In the perceptual evaluation step, the perceptual evaluation of NoLoss$_j$ is set to constant number 1. The perceptual evaluation of SubSection$_i$ is estimated based on equation (1) as described above.

In the pooling step an overall jerkiness evaluation is estimated based on the perceptual evaluation of all the sections according to equation (3) as described above.

Another embodiment of the present invention provides an apparatus for measuring the quality of a video based on frame loss pattern.

Figure 5:
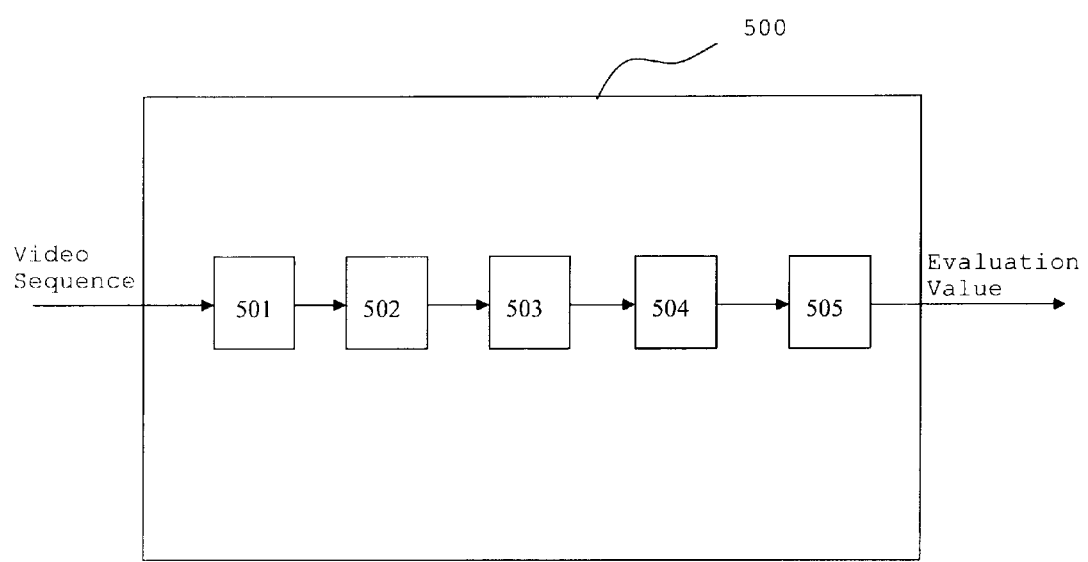
FIG. 5 is a block diagram showing an apparatus for measuring the quality of a video based on frame loss pattern according to the embodiment of the present invention.

FIG. 5 is a block diagram showing an apparatus for measuring the quality of a video based on frame loss pattern according to the embodiment of the present invention.

As shown in FIG. 5, the apparatus 500 comprises: a frame loss patern generating unit 501 for receiving an input video sequence and generating a frame loss pattern of the received video sequence; a grouping unit 502 for receving the frame loss pattern from the frame loss patern generating unit 501 and grouping, from the first lost frame, one or more consecutive lost frames in the frame loss pattern into a group frame loss; a dividing unit 503 for receiving the grouped frame loss pattern from the grouping unit 502 and dividing, from the first group frame loss, the frame loss pattern into a plurality of sections having one or more consecutive group frame losses, each group frame loss in a section having the same number of successfully transmitted frames between the group frame loss and its previous group frame loss and the the number of lost frames; a calculating unit 504 for calculating a value of the quality degradation generated by each section of group frame loss outputted by the dividing unit 503; and a evaluating unit 505 for evaluating the quality of the video sequence by combining the values of all sections outputted by the calculating unit 504 and outputting the value.

Figure 6:
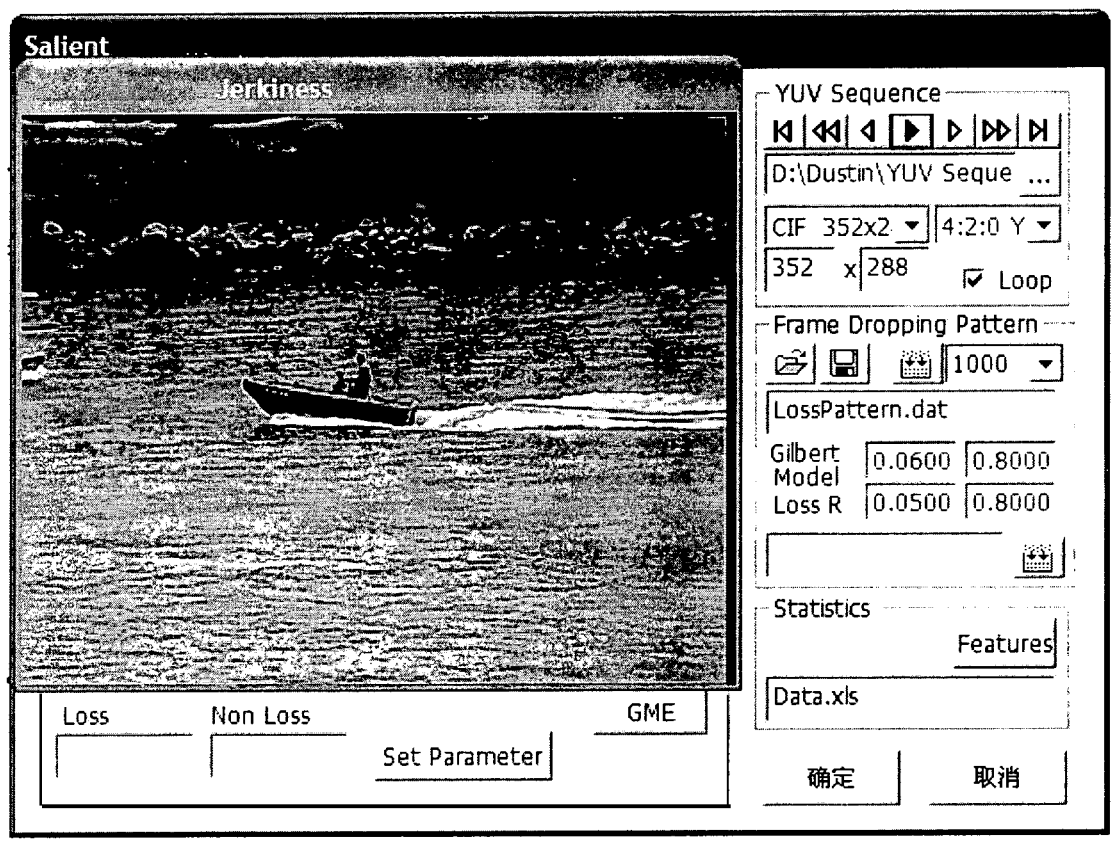
FIG. 6 is a diagram showing the interface of a software tool that is designed to have a subjective test of a video quality.

Experiments were done to estimate the evaluation accuracy of the present invention compared with the prior arts 1 and 2. For this purpose, a software tool is designed to have a subjective test of a video quality. FIG. 6 is a diagram showing the interface of a software tool that is designed to have the subjective test. The input video sequence can be selected in the right "YUV Sequence" group-box and the frame loss pattern can be selected in the right-center "Frame loss Pattern" group-box. The video sequence which is affected by the frame loss pattern is then displayed in the left small window.

A viewer is then required to mark the perception of jerkiness as follows:

1—no perceived quality degradation;
2—can find some un-natural place in temporal axis by carefully checking, but does not influence enjoying the video;
3—clear quality degradation, usually feels being interrupted.
4—the quality degradation is quite annoying
5—too bad, totally cannot bear the video In the subjective test, 10 CIF (video resolution of 352×288 pixels) sequences is selected and 20 frame loss pattern is chosen. Three viewers are invited to score while their average value is considered the subjective score, denoted as $J_S$. All the sequence with the marked score composed the dataset DS.

Parameters Setting:

In the implementation, the constant numbers are determined experientially. $\beta_1=\beta_2=1$. $\beta_3=2$; c=1.5; $c_{still}=0.23$.

And for simplicity, a 300-frame window was taken as the memory size while supposing that a viewer will forget about the quality of the frames before this window. And inside the window, set $f_T=1$ and Set $f_D(d)=6-d$. $f_1(x,y)$ and $f_2(x,y)$ are determined by Table 1 and Table 2 described above.

Experimental Results:

The evaluation accuracy of the present invention is estimated by comparing the objective evaluation result J obtained according to the present invention with the subjective score $J_E$. Pearson Correlation is used for the prediction accuracy measurement.

The below table shows the Pearson Correlation (prediction accuracy) of the present invention and the algorithm proposed in the prior arts 1 and 2.

| | |
|---|---|
| Algorithm proposed in the prior art 1 | 0.45 |
| Algorithm proposed in the prior art 2 | 0.62 |
| J obtained by the present invention | 0.75 |

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two.

The invention claimed is:

1. A method for measuring a quality of video, comprising:
generating a frame loss pattern of the video by recording, in sequence, a status for every successive frame in a group of frames and establishing for each such group of frames an arrangement indicating whether each frame in the group is lost or successfully transmitted relative to all frames in the group; and
evaluating the quality of the video as a function of the generated frame loss pattern.

2. A method for measuring a quality of video, comprising:
generating a frame loss pattern of the video by indicating whether each frame in the video is lost or successfully transmitted; and
evaluating the quality of the video as a function of the generated frame loss pattern by the steps of:
grouping, from the first lost frame, one or more consecutive lost frames in the video into a group frame loss;
dividing, from the first group frame loss, the frame loss pattern into a plurality of sections having one or more consecutive group frame losses, each group frame loss in a section having the same number of successfully transmitted frames between the group frame loss and its previous group frame loss and the same number of lost frames;
calculating a value of the quality degradation generated by each section of group frame loss; and
evaluating the quality of the video by combining the values of all sections.

3. The method according to claim 2, further comprising calculating the value of the quality degradation generated by a section of group frame loss as a function of the average number of successfully transmitted frames between two neighboring group frame losses in the section and the average number of lost frame of all the group frame losses in the section.

4. The method according to claim 2, wherein said evaluation comprises combining the values of all sections by a weighted pooling.

5. The method according to claim 4, wherein a weighting factor of one section in the weighted pooling depends on the number of frames in the section, the distance of the center of the section to the last frame and the perceptual temporal degradation introduced by the section.

6. Apparatus for measuring a quality of video, comprising:
a receiver configured to receive an input video and generating a frame loss pattern of the received video by recording, in sequence, a status for every successive frame in a group of frames and establishing for each such group of frames an arrangement indicating whether each frame in the group is lost or successfully transmitted relative to all frames in the group; and
an evaluator unit configured to evaluate the quality of the video as a function of the generated frame loss pattern.

7. Apparatus for measuring a quality of video, comprising:
a receiver configured to receive an input video and generating a frame loss pattern of the received video; and
a first evaluator unit configured to evaluate the quality of the video as a function of the generated frame loss pattern, wherein the evaluating means includes:
a grouping unit configured to receive the frame loss pattern from the frame loss pattern generating unit and grouping, from the first lost frame, one or more consecutive lost frames in the frame loss pattern into a group frame loss;
a dividing unit configured to receive the grouped frame loss pattern from the grouping unit and dividing, from the first group frame loss, the frame loss pattern into a plurality of sections having one or more consecutive group frame losses, each group frame loss in a section having the same number of successfully transmitted frames between the group frame loss and its previous group frame loss and the same number of lost frames;
a calculating unit configured to calculate a value of the quality degradation generated by each section of group frame loss outputted by the dividing unit; and
a second evaluating unit configured to evaluate the quality of the video by combining the values of all sections outputted by the calculating unit and outputting the value.

8. The apparatus according to claim 7, wherein said calculating unit calculates the value of the quality degradation generated by a section of group frame loss as a function of the average number of successfully transmitted frames between two neighboring group frame losses in the section and the average number of lost frame of all the group frame losses in the section.

9. The apparatus according to claim 7, wherein said second evaluating unit combines the values of all sections by a weighted pooling.

10. The apparatus according to claim 9, wherein a weighting factor of one section in the weighted pooling depends on the number of frames in the section, the distance of the center of the section to the last frame and the perceptual temporal degradation introduced by the section.

* * * * *